United States Patent Office 3,649,666
Patented Mar. 14, 1972

3,649,666
PROCESS FOR THE HYDRODIMERIZATION OF ACRYLIC ACID DERIVATIVES
Yael Arad, Tel Aviv, and Moshe Levy, Israel R. Miller, and David Vofsi, Rehovoth, Israel, assignors to UCB (Union Chimique-Chemische Bedrijven) S.A., Brussels, Belgium
No Drawing. Filed Mar. 7, 1967, Ser. No. 621,116
Claims priority, application Israel, Mar. 9, 1966, 25,344
Int. Cl. C07c 121/20, 121/28
U.S. Cl. 260—465.8
13 Claims

ABSTRACT OF THE DISCLOSURE

High yields of objective dimer are obtained in the hydrodimerization of functional derivatives of acrylic acid by means of alkali metal amalgam in a medium containing water and DMSO, while allowing the reaction mixture to become as strongly alkaline as corresponds to the decomposition of the alkali metal amalgam in the course of the reaction, whereby no pH control of the reaction medium is necessary.

---

This invention relates to the hydrodimerization of functional derivatives of acrylic acid, more particularly of acrylonitrile, lower-alkyl acrylic acid esters and acrylamide, to form the corresponding functional derivatives of adipic acid. The dimerization may be one in which two molecules of the same acrylic acid derivative are combined into a symmetric adipic acid derivative ("homodimerization"), or one in which two different acrylic derivatives are combined into asymmetric adipic acid derivatives, i.e. having different functional groups at both ends of their chain ("heterodimerization").

The adipic acid derivatives prepared by the process according to the invention are destined for use as reactants in the per se conventional manufacture of polyamide fibers and polyamide plastics in general.

There has been proposed a process in which the aforesaid hydrodimerization is carried out by means of alkali metal amalgam in a medium containing water and dimethyl sulfoxide (DMSO), the latter being preferably used in a large excess (in terms of volume ratio) over the water.

In accordance with that process the pH of the reaction mixture is maintained in the course of the reaction within a defined range, namely from 8 to 12, preferably from 8.5 to 9.5. This is achieved by the gradual addition of acid to the reaction mixture, e.g. acetic or sulfuric acid.

It has now been found that high yields of the desired dimer can be achieved if the reaction mixture is allowed to become as strongly alkaline as corresponds to the decomposition of the alkali metal amalgam, and that consequently no pH control of the medium is necessary.

The invention consists in a process for the hydrodimerization of functional derivatives of acrylic acid, wherein the acrylic monomer is subjected to reaction with an alkali metal amalgam in a medium containing dimethyl sulfoxide (DMSO) and water which is allowed to become as strongly alkaline as corresponds to the decomposition of the amalgam in the course of the reaction.

In order to obtain a high yield of the desired dimer without controlling the pH of the medium, it is necessary in accordance with the invention to carry out the reaction in a medium where the reaction is very fast and under very efficient mixing of the amalgam and the solution, so that the hydrodimerization takes place in a very short period thus avoiding any side reactions which occur in alkaline media.

Another preferred condition is maintaining a low temperature of —10° to +10° C. throughout the reaction period, with a very efficient cooling so that local overheating does not take place.

An advantage of the process according to the invention is that no acid is consumed and that the alkali hydroxide formed usually separates as a concentrated aqueous phase. Thus, alkali hydroxide can easily be recovered as a useful by-product in accordance with the present invention whereas, previously, the alkali liberated in the reaction had to be neutralized by acid in order to maintain a constant pH, and was converted to a much less valuable product.

The solvent medium for the reaction comprises DMSO and water mixture. The ratio of DMSO/water may be from about 0.5:1 to 10:1 v./v. or even higher, the preferred range being 2:1 to 6:1. The solvent medium may consist either of the above mixture or alternatively may also be predominantly an ether such as tetrahydrofuran, dioxan, dimethoxyethane or diglyme with small amounts of DMSO (10–30%) and water (15–10%). Other less efficient solvents but still giving reasonably good results are alcohols such as t-butanol or nitriles such as acetonitrile. The solvents that may be used to replace a good part of the DMSO in the reaction medium must be partially miscible with water. For instance, ethers substantially immiscible with water, such as diethyl-ether, cannot be used advantageously in accordance with the present invention.

Among the various alcohols, only tertiary alcohols containing no more than 6 carbon atoms per hydroxyl group present may be used with advantage. The advantage in using these solvents to replace a major portion of the DMSO in the medium is in the ease with which such solvents can be recovered from the reaction medium, thus providing technical advantages to the process.

The concentration of the monomer, e.g. acrylonitrile, in the reaction medium may be, for example, from below 5 to above 20 grams per 100 milliliters, higher concentrations being conducive to the production of some polymer. The preferred range of concentration is of about 5 to 10 grams/100 milliliters.

If the selected reaction conditions favor the formation of some polymer in addition to the desired dimer, e.g. with a monomer concentration of above 15 grams/100 milliliters in the reaction medium, or at a reaction temperature above 20° C., or with a DMSO:water ratio greater than 8:1, the undesired polymer formation can be prevented or largely reduced by the addition of polymerization inhibitors to the reaction mixture. Known radical-polymerization inhibitors can be used for this purpose; aminoanthraquinone has been found to be particularly suitable.

The invention is illustrated by the following examples to which, however, it is not limited.

EXAMPLE 1

100 milliliters of an aqueous solution containing 10 grams of acrylonitrile, 70 milliliters of DMSO and 17.5 milliliters of water (DMSO:water ratio=4:1) were introduced into a flask containing 1.2 kilograms of sodium amalgam (sodium concentration 0.5% by weight). The flask was cooled in ice water and the reaction was allowed to proceed for 15 minutes under vigorous swirling. The amalgam was then separated from the reaction mixture and the remaining sodium content was determined by acid titration. The reaction mixture was extracted with methylene chloride. A sample was analyzed by vapor phase chromatography and showed that the solution contained 9 grams of adiponitrile, 0.5 gram of unreacted acrylonitrile and 0.1 gram of propionitrile. The yield of adiponitrile calculated on reacted acrylonitrile was 95%, and calculated on reacted sodium metal 95%. No oxydipropionitrile or polymer were detected. For recovering the several components, the extract was subjected to fractional distillation under atmospheric pressure which yielded fractions of methylene chloride, acrylonitrile and DMSO in this order. The distillation was continued in a vacuum of 20 mm. Hg pressure for recovering the adiponitrile which, at this pressure, distilled at 180–182° C.

EXAMPLE 2

The process was carried out as described in Example 1 but 2.5 kilograms of potassium amalgam was used instead of sodium amalgam. The potassium content was 0.4% by weight. The product contained 8.1 grams of adiponitrile and 0.7 gram of unreacted acrylonitrile, corresponding to an adiponitrile yield of 87% calculated on the basis of acrylonitrile used in the reaction, and to a 90% yield calculated on the potassium used.

EXAMPLE 3

The process was carried out as described in Example 1, but 2.5 kilograms of lithium amalgam (lithium concentration 0.05% by weight) was used instead of sodium amalgam. The products contained 4.5 grams of adiponitrile and 4.2 grams of unreacted acrylonitrile, corresponding to an adiponitrile yield of 77% and a metal conversion yield of 90%. A small quantity of oxydipropionitrile was also formed.

EXAMPLE 4

The process was carried out as described in Example 1, but the sodium content of the amalgam was 0.1% by weight.

The product contained 7.6 grams of adiponitrile and 1.5 grams of unreacted acrylonitrile, corresponding to an adiponitrile yield of 90%.

EXAMPLE 5

The process was performed as described in Example 1, but the reaction mixture contained 10 grams of acrylonitrile, 44 milliliters of DMSO and 44 milliliters of water (DMSO:water ratio=1:1). The product contained 6 grams of adiponitrile, 1.7 grams of propionitrile and 1.8 grams of unreacted acrylonitrile. The yield of adiponitrile calculated on the basis of reacted acrylonitrile was 73%. The aggregate metal conversion yield for adiponitrile and propionitrile was 93%.

EXAMPLE 6

100 milliliters of a solution containing 10 grams acrylamide and having a DMSO:water ratio of 4:1 was reacted with sodium amalgam as described in Example 1. After termination of the reaction 6 grams of adipamide precipitated which was recovered by filtration. 0.5 gram of unreacted acrylamide was recovered from the filtrate by solvent extraction.

The adipamide, recrystallized from water, had a melting point of 228° C. The yield calculated on the amount of reacted acrylamide was 63%.

EXAMPLE 7

100 milliliters of an aqueous solution containing 10 grams of 1-methyl acrylonitrile, 73 milliliters of DMSO and 14.5 milliliters of water (DMSO:water ratio=5:1) was reacted with sodium amalgam as described in Example 1. The product contained 7.0 grams of 2,5-dimethyl adiponitrile, 0.5 gram of isobutyronitrile and 1.5 grams of unreacted methyl acrylonitrile. The yield was 82% of dimethyl adiponitrile, calculated on the reacted methyl acrylonitrile. The sodium conversion yield was 86%. The dimethyl adiponitrile consisted of a mixture of d,l- and meso-dimethyl adiponitrile boiling at 110° C./0.4 mm. and 116° C./0.9 mm. Hg pressure, respectively.

Methyl acrylonitrile has not hitherto been dimerized by the amalgam process.

EXAMPLE 8

100 milliliters of an aqueous solution containing 10 grams of methyl acrylonitrile, 3 grams of acrylonitrile (molar ratio of methyl acrylonitrile:acrylonitrile=2.7:1), 70 milliliters of DMSO and 15.0 milliliters of water, was reacted with sodium amalgam as described in Example 1. The reaction was completed within 2 minutes.

The reaction product contained 2 grams of the heterodimer methyl adiponitrile, 1.3 grams of adiponitrile, 0.4 gram of dimethyl adiponitrile and 7.5 grams of unreacted methyl acrylonitrile. The ratio of the heterodimer to adiponitrile was 1.5. The metal conversion yield, calculated on the aggregate amount of dimers, was 90%.

EXAMPLE 9

5 grams of acrylonitrile were dissolved in a solvent mixture consisting of 75 milliliters of tetrahydrofuran, 20 milliliters of DMSO and 5 milliliters of water. The solution was treated with sodium amalgam in the manner described in Example 1. The products were 4.5 grams of adiponitrile and 0.2 gram of propionitrile, corresponding to an adiponitrile yield of 90% and a metal conversion yield of 95%.

EXAMPLE 10

100 milliliters of a solution containing 10 grams of acrylonitrile, 45 milliliters of dioxane, 32.5 milliliters of DMSO and 10 milliliters of water was treated with sodium amalgam in the manner described in Example 1. The reaction products consisted of 9.0 grams of adiponitrile and 0.5 gram of propionitrile, corresponding to an adiponitrile yield of 90% and a metal conversion yield of 92%.

EXAMPLE 11

The process was carried out in a continuous manner in a flow system.

A solution containing 10% of acrylonitrile in a solvent consisting of DMSO and water in a ratio 3/1 was cooled in ice water. In a separate container sodium amalgam (0.5% by weight of sodium) was also cooled to 0° C.

The two liquids were then forced by a sigma pump through rubber tubes into a narrow reaction tube where they were thoroughly mixed by a high frequency vibrator. The reaction mixture then overflowed into another flask. The mercury phase and the organic phase were separated. The actual reaction time, during which the two phases were in close contact, was about 5 secs. The products were then separated in the manner described in Example 1. They consisted of 90% of adiponitrile and 2% propionitrile. The metal conversion yield was 90%.

We claim:

1. A process for the hydrodimerization of derivatives of acrylic acid selected from the group consisting of acrylonitrile, 1-methyl-acrylonitrile, lower alkyl acrylic acid esters, acrylamide and a mixture of acrylonitrile and 1-methyl-acrylonitrile, which comprises subjecting, at a temperature in the range of from −10° C. to about +20° C., said derivative or said mixture to intimate admixture and ensuing reaction with alkali metal amalgam in a reaction medium consisting essentially of dimethyl sulfoxide and water in a volume ratio of dimethyl sulfoxide to water in the range of from about 0.5:1 to about 10:1, while allowing said medium to become as strongly alkaline as corresponds to the decomposition of the amalgam in the course of the reaction, and recovering a symmetric adipic acid derivative when two molecules of the same acrylic derivative are hydrodimerized and recovering methyl adiponitrile when a mixture of acrylonitrile and 1-methyl-acrylonitrile is hydrodimerized, said reaction being completed in a time sufficiently short to avoid undesired side reactions.

2. A process for the hydrodimerization of derivatives of acrylic acid selected from the group consisting of acrylonitrile, 1-methyl-acrylonitrile, lower alkyl acrylic acid esters, acrylamide and a mixture of acrylonitrile and 1-methyl-acrylonitrile, which comprises subjecting, at a temperature in the range of from −10° C. to about +20° C., said derivatives or said mixture to intimate admixture and ensuing reaction with alkali metal amalgam in a reaction medium consisting essentially of 10 to 30% by volume of dimethyl sulfoxide and 10 to 15% by volume of water, the balance being tertiary butanol or acetonitrile or an ether selected from the group of tetrahydrofuran, dioxan, dimethoxyethane and diethylene glycol dimethyl ether, while allowing said medium to become as strongly alkaline as corresponds to the decomposition of the amalgam in the course of the reaction, and recovering a symmetric adipic acid derivative when two molecules of the same acrylic acid derivative are hydrodimerized and recovering methyl-adiponitrile when a mixture of acrylonitrile and 1-methyl acrylonitrile is hydrodimerized, said reaction being completed in a time sufficiently short to avoid undesired side reactions.

3. The method of claim 1 wherein said intimate admixture is obtained by vigorous mixing.

4. The method of claim 3 wherein the reaction is completed within a maximum time period of 15 minutes.

5. The method of claim 2 wherein the intimate admixture is obtained by vigorous mixing.

6. The method of claim 5 wherein the reaction is completed within a maximum time period of 15 minutes.

7. A process according to claim 1, wherein the reaction is carried out at a temperature range of from $-10°$ to $+10°$ C.

8. A process according to claim 1, wherein in the reaction medium the volume ratio of dimethyl sulfoxide to water is from 2:1 to 6:1.

9. The process of claim 2 wherein said balance of the reaction medium is tetrahydrofuran.

10. The process of claim 2 wherein said balance of the reaction medium is dioxan.

11. The process of claim 2 wherein said balance of the reaction medium is tertiary butanol.

12. The process of claim 2 wherein said balance of the reaction medium is acetonitrile.

13. The process of claim 2 wherein the reaction is carried out at a temperature range of from $-10°$ to $+10°$ C.

References Cited
UNITED STATES PATENTS

| | | | |
|---|---|---|---|
| 3,455,986 | 7/1969 | Jones | 260—465.8 |
| 3,356,708 | 12/1967 | Davies et al. | |

JOSEPH P. BRUST, Primary Examiner

U.S. Cl. X.R.

260—465.1, 465.4, 465.6, 485 R, 561 K